(12) United States Patent
Kasevich (10) Patent No.: US 6,413,399 B1
(45) Date of Patent: Jul. 2, 2002

(54) SOIL HEATING WITH A ROTATING ELECTROMAGNETIC FIELD

(75) Inventor: Raymond S. Kasevich, Mt. Washington, MA (US)

(73) Assignee: KAI Technologies, Inc., Great Barrington, MA (US)

( * ) Notice: Subject to any disclaimer, the term of this patent is extended or adjusted under 35 U.S.C. 154(b) by 0 days.

(21) Appl. No.: 09/574,359

(22) Filed: May 19, 2000

Related U.S. Application Data (60) Provisional application No. 60/161,947, filed on Oct. 28, 1999.

(51) Int. Cl.[7] ............................................. B01D 61/56
(52) U.S. Cl. ..................... 204/515; 204/600; 588/204; 405/131
(58) Field of Search ................... 204/515, 600; 588/204; 405/131

(56) References Cited

U.S. PATENT DOCUMENTS

| | | | |
|---|---|---|---|
| 4,957,393 A | 9/1990 | Buelt et al. | 405/128 |
| 5,330,291 A | 7/1994 | Heath et al. | 405/128 |
| 5,347,070 A | 9/1994 | Heath et al. | 588/253 |
| 5,415,744 A | * 5/1995 | Jacobs | 204/515 |
| 5,433,829 A | 7/1995 | Pool | |
| 5,589,056 A | 12/1996 | Pool | |
| 5,846,393 A | 12/1998 | Clarke et al. | |

OTHER PUBLICATIONS

"A Planar Diversity Antenna for Handheld PCS Devices" by Mark G. Douglas et al., IEEE Transactions on Vehicular Technology, vol. 47, No. 3, pp. 747–753, Aug. 1998.

"Tracking Fluid Flow in the Unsaturated Zone Using Cross-–Borehole Resistivity and IP" by Susan Schime et al. (Abstract) pp. 527–543. (No Date).

"Six Phase Soil Heating" by U.S. Department of Energy, Apr. 1995.

* cited by examiner

Primary Examiner—Arun S. Phasge
(74) Attorney, Agent, or Firm—Fish & Richardson P C (57) ABSTRACT

A soil remediation system heats contaminated soil by generating a rotating sub-surface electromagnetic field. The system includes three electrodes disposed 120 degrees apart on a remediation circle. These electrodes are excited by AC voltages with 120 degree phase differences relative to each other. This results in the generation of a sub-surface traveling wave that propagates in a circumferential direction.

25 Claims, 7 Drawing Sheets

SOIL HEATING WITH A ROTATING ELECTROMAGNETIC FIELD

CROSS RELATED APPLICATION

Under 35 USC § 119(e)(1), this application claim the benefit of provisional application serial No. 60/161,947, filed Oct. 28, 1999.

BACKGROUND

This invention relates to the field of soil remediation, and in particular, to the evaporation of volatile contaminants through sub-surface soil heating.

An unfortunate byproduct of the rise of the chemical and petrochemical industries is that on occasion, toxic chemicals find their way into the soil. In the short-term, these toxic chemicals can devastate the local flora and fauna. Given enough time, these chemicals can percolate through the soil and into municipal water supplies where they can cause widespread illnesses in the local population. It is therefore important to quickly remove these chemicals from the contaminated soil.

A known method of removing volatile chemicals from contaminated soil is to heat the soil above the boiling point of those chemicals. This heating causes the chemicals to vaporize. The chemical vapors rising from the soil are then collected and condensed for proper disposal.

A known method of heating the soil is to bore pairs of holes into the soil and to insert electrodes into those holes. When a voltage is applied between the electrodes, current flows from one electrode, through the soil, and into the other electrode. As the current passes through the soil, it encounters resistance. This resistance results in the generation of heat.

A disadvantage of the foregoing soil heating method is that the soil is heated only along the current path between a pair of, electrodes. As a result, the temperature distribution in the soil is uneven. It is true that given enough time, heat will flow from hot portions of the soil to cooler portions of the soil, thereby equalizing the temperature distribution within the soil. However, when toxic chemicals are seeping ever closer to municipal water supplies with each passing hour, time is of the essence.

The problem of uneven heat distribution in the soil has been addressed by inserting many more pairs of electrodes into the soil. This results in many more sub-surface current paths along which soil can be heated. However, this solution results in the need to bore many more holes in the soil. The mechanical disturbances associated with boring these holes can affect the sub-surface properties of the soil in a way that accelerates the dispersal of toxic chemicals.

What is therefore desirable in the art is a method and system for evenly heating contaminated soil while minimizing the number of electrodes inserted into the soil.

SUMMARY

A soil remediation system according to the invention generates a sub-surface rotating field that drives currents within a remediation zone. Because the magnitudes of these currents are responsive to the sub-surface field distribution, and because the sub-surface field is a rotating field, the current density within the remediation zone, when integrated over time, is relatively uniform. As a result, the soil remediation system of the invention uniformly heats the contaminated soil.

A soil remediation system for heating contaminated soil includes three electrodes in electrical communication with the contaminated soil and positioned approximately 120 degrees apart on the circumference of a remediation circle. Each electrode is driven by an AC voltage. The second and third electrodes differ in phase from the first electrode by 120 and 240 degrees respectively.

To enhance its safety, the soil remediation system can further include a neutral electrode in electrical communication with the first, second, and third electrodes. This neutral electrode is typically disposed at the center of the remediation circle.

The electrodes, including the neutral electrode if one is present, can be positioned to ensure an overlap between the remediation zone generated by the electrodes and the region of contamination. Where the contaminated region is parallel to the earth's surface, the first and second electrodes penetrate the earth to the same depth. However, where the contaminated region is not parallel to the earth's surface, the first and second electrodes can be inserted at different depths. This tilt in the angle of the remediation circle relative to the earth's surface changes the geometry of the remediation zone to match that of the contaminated region.

The electrodes themselves can be partially sheathed by an insulating jacket so as to form an insulated section and an uninsulated section in electrical communication with the insulated section. Preferably, the insulating jacket can be moved along a longitudinal axis of the electrode so as to adjust the relative surface areas of the insulated and uninsulated sections, thereby permitting further adjustment of the geometry of the remediation zone.

In another aspect of the invention, a soil remediation system includes a plurality of voltage sources that are operable with phase differences relative to each other. Equivalently, the soil remediation system can include a single voltage source with a plurality of phase delayed outputs. The voltage sources are connected to a corresponding plurality of electrodes that are disposed at selected locations in the contaminated volume. The phase delays between sources and the locations of each electrode are selected so to generate a sub-surface rotating field.

The invention also includes a method for heating contaminated soil by generating a rotating electromagnetic field within the soil. This is achieved by inserting first, second, and third electrodes along the circumference of a remediation circle and applying first, second, and third voltages to the first, second, and third electrodes respectively, thereby generating a sub-surface rotating electromagnetic field.

Preferably, the first, second, and third electrodes are disposed 120 degrees apart along the remediation circle and the electrodes are excited by voltages that are likewise 120 degrees apart. This can be achieved by applying a phase difference of 120 degrees between the first voltage and the second voltage, and applying a phase difference of 240 degrees between the first voltage and the third voltage.

Because not all contamination zones have the same shape, the method also includes the positioning of the first, second, and third electrodes to generate a remediation zone having a specified geometry. This can be achieved by selecting first, second, and third penetration depths for the first, second, and third electrodes respectively. Further refinement of the shape of the remediation zone can also be achieved by providing the first electrode with an insulated section having an insulated surface area and an uninsulated section having an uninsulated surface area, the uninsulated section being in electrical communication with the insulated section. The insulated and uninsulated surface areas can then be adjusted to form a remediation zone having a specified geometry.

These and other features of the invention will be more apparent upon reading the following detailed description and the accompanying figures in which:

DETAILED DESCRIPTION

Figure 1:
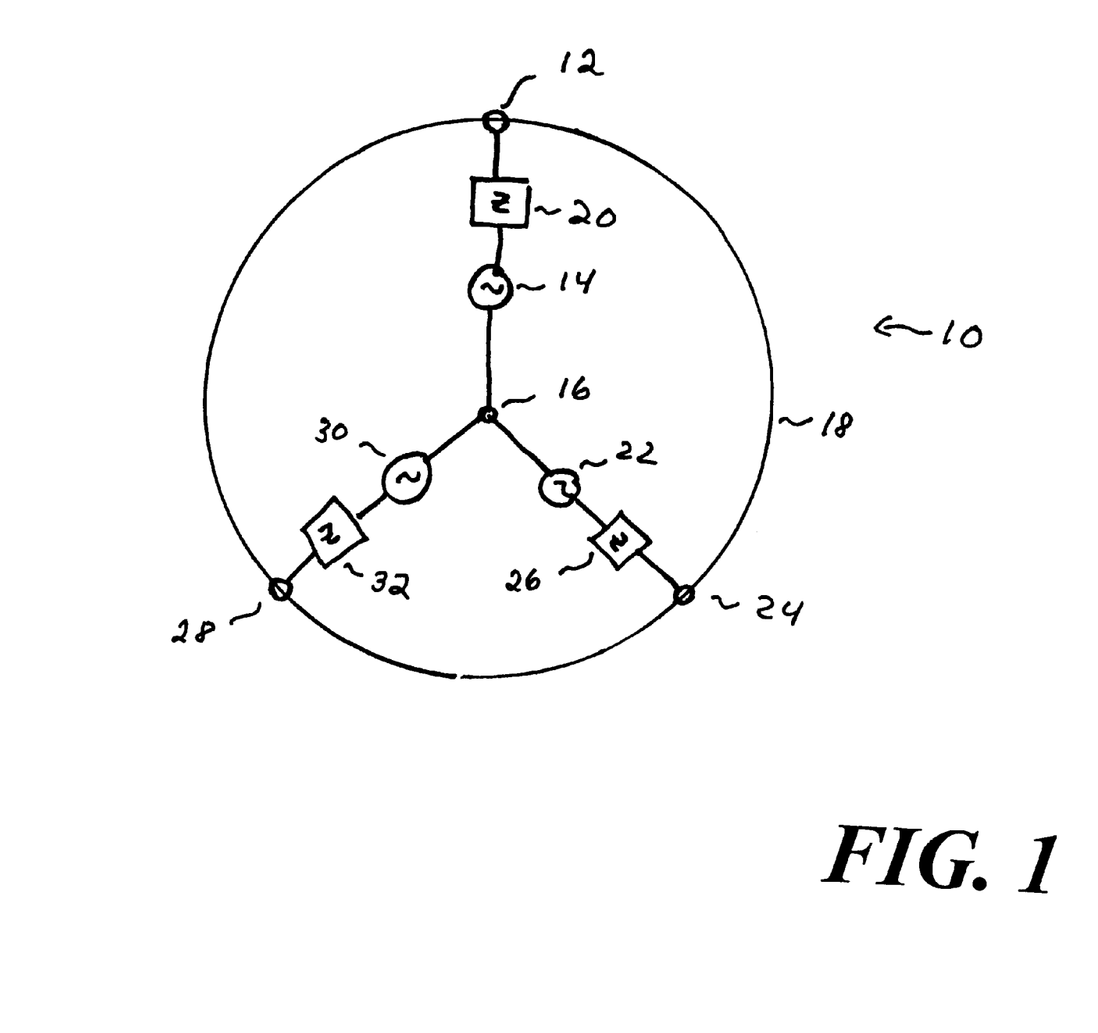
FIG. 1 is a plan view of a soil remediation system according to the invention.

FIG. 1 shows a plan view of a soil remediation system 10 according to the invention. The illustrated soil remediation system 10 includes a first electrode 12 inserted into the earth. A first AC voltage source 14 provides a sinusoidal voltage between the first electrode 12 and a neutral electrode 16, also inserted into the earth. The distance between the first electrode 12 and the neutral electrode 16 defines the radius of a remediation circle 18 having the neutral electrode 16 at its center. In a preferred embodiment, the AC voltage source operates at 60 Hz for compatibility with supplied line power.

The neutral electrode 16, the first voltage source 14, and the first electrode 12 define a first underground circuit in which the return path for current is provided by the soil between the first electrode 12 and the neutral electrode 16. The distributed electrical properties of the soil, as well as any line impedances, are represented in FIG. 1 by a first lumped impedance 20.

The soil remediation system 10 further includes a second voltage source 22 that provides a sinusoidal voltage between a second electrode 24 and the neutral electrode 16. The second electrode 24 is disposed on the remediation circle 18 such that a radial line from the second electrode 24 to the neutral electrode 16 and a radial line from the first electrode 12 to the neutral electrode 16 form a 120 degree angle. The voltage applied by the second voltage source 22 is a sinusoidal voltage having an amplitude equal to that supplied by the first voltage source 14 but retarded in phase by 120 degrees. The second electrode 24, the second voltage source 22, and the neutral electrode 16 define a second underground circuit in which the return path for current is provided by the soil between the second electrode 24 and the neutral electrode 16. The distributed impedance associated with this return path, as well as any line impedance, are represented in FIG. 1 by a second lumped impedance 26.

The remediation system 10 also includes a third electrode 28 disposed on the remediation circle 18 such that a radial line extending between the third electrode 28 and the neutral electrode 16 forms a 120 degree angle with radial lines extending between the neutral electrode 16 and the first and second electrodes 12, 24. A third voltage source 30 provides a sinusoidal voltage between the neutral electrode 16 and the third electrode 28. This sinusoidal voltage is identical to that provided by the second electrode 22, but delayed in phase by 120 degrees. The third electrode 28, the neutral electrode 16, and the third voltage source 30 define a third underground circuit similar to the first and second underground circuits already discussed. The distributed impedance associated with this third underground circuit is represented in FIG. 1 by a third lumped impedance 32.

Figure 2:
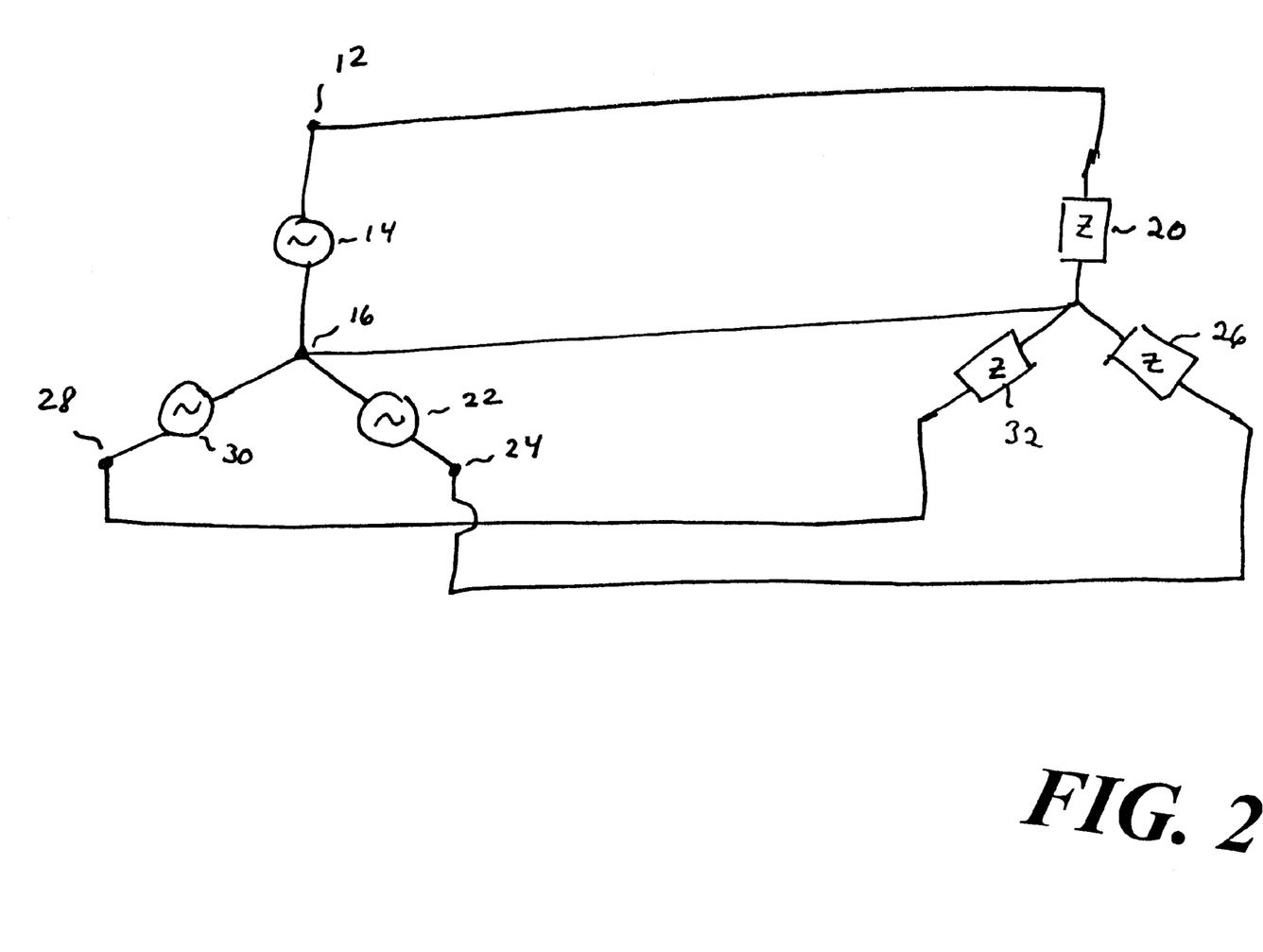
FIG. 2 is a polyphase equivalent circuit for the soil remediation system of FIG. 1.

The soil remediation system 10 shown in FIG. 1 can thus be viewed as a polyphase circuit with a Y-Y connection, as shown in FIG. 2. In FIG. 2, the circuit is shown with a balanced load, in which case there is no net current to the neutral electrode 16. However, it is also possible, depending on sub-surface conditions, for the loads to be unbalanced. Under these circumstances, the neutral electrode 16 provides a measure of safety by acting as a sink for current generated by the remaining three electrodes.

Figure 3:
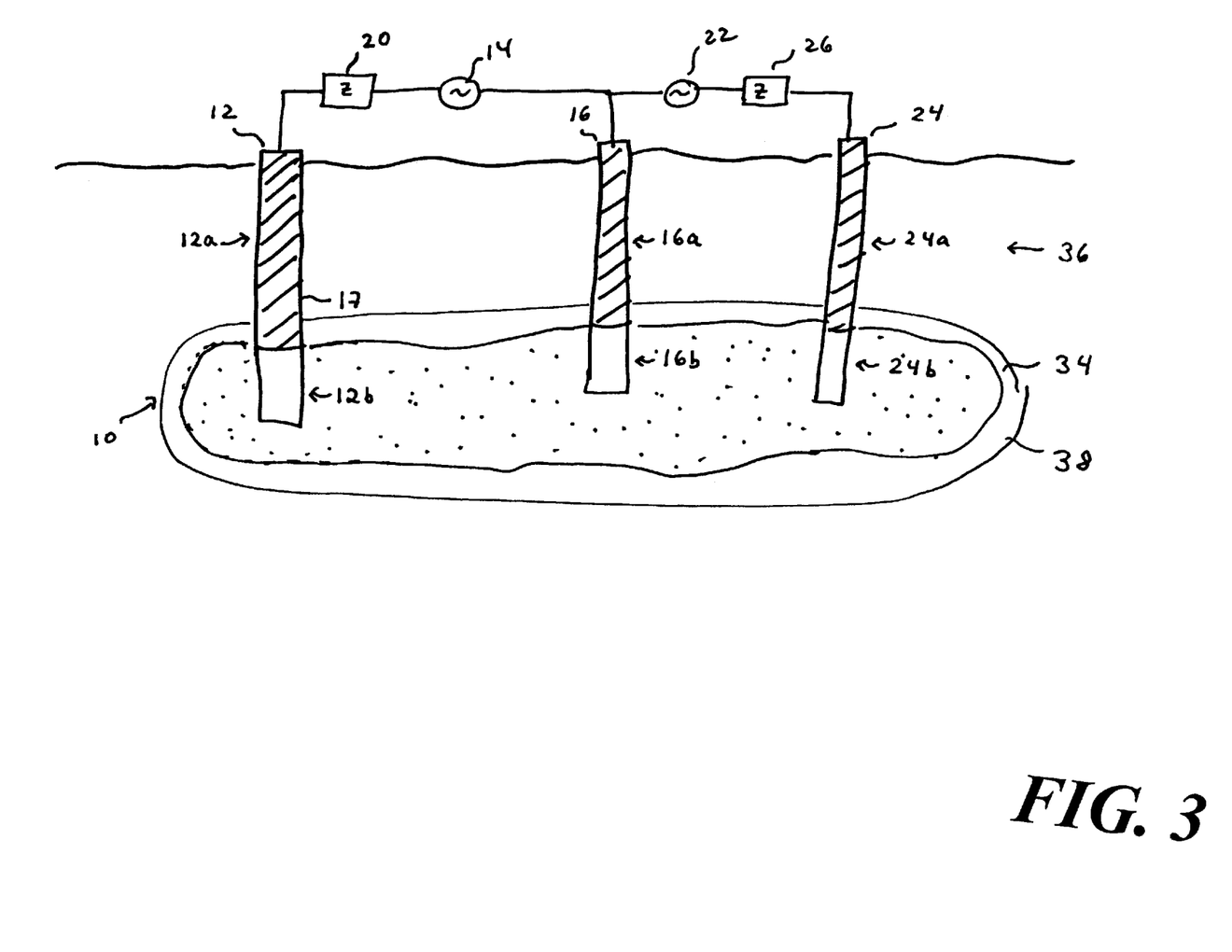
FIG. 3 shows the soil remediation system of FIG. 1 from a sub-surface perspective.

FIG. 3 shows the remediation system 10 of FIG. 1 from a sub-surface perspective. As shown in FIG. 3, the first electrode 12 has an insulated section 12a coated with an insulating material and an uninsulated section 12b in direct contact with the soil. The second electrode 24, the neutral electrode 16 and the third electrode 28 (not shown in FIG. 3) likewise have insulated sections 16a, 24a, 28a and uninsulated sections 16b, 24b, 28b. The insulated sections 12a, 16a, 24a, 28a are preferably coated with an insulating jacket 17 made of an insulating material such as polyvinyl chloride (PVC) or polytetrafluoroethylene (sold by the DuPont Corporation under the trademark TEFLON). Preferably, the insulating jacket 17 is movable or slidable along a longitudinal axis of an electrode 12, 16, 24, 28.

The electrodes 12, 16, 24, 28 are deployed so that their uninsulated sections 12b, 16b, 24b, 28b are in contaminated soil 34 and their insulated sections 12a, 16a, 24a, 28a are in intervening soil 36 that is largely free of contaminants but that must nevertheless be penetrated in order to reach the contaminated soil 34. FIG. 3 shows an electrode deployment in which the contaminated soil occupies a layer that is parallel to the earth's surface. As a result, the electrodes 12, 16, 24, 28 are disposed such that their respective uninsulated sections 12b, 16b, 24b, 28b are all at substantially the same depth.

Figure 4:
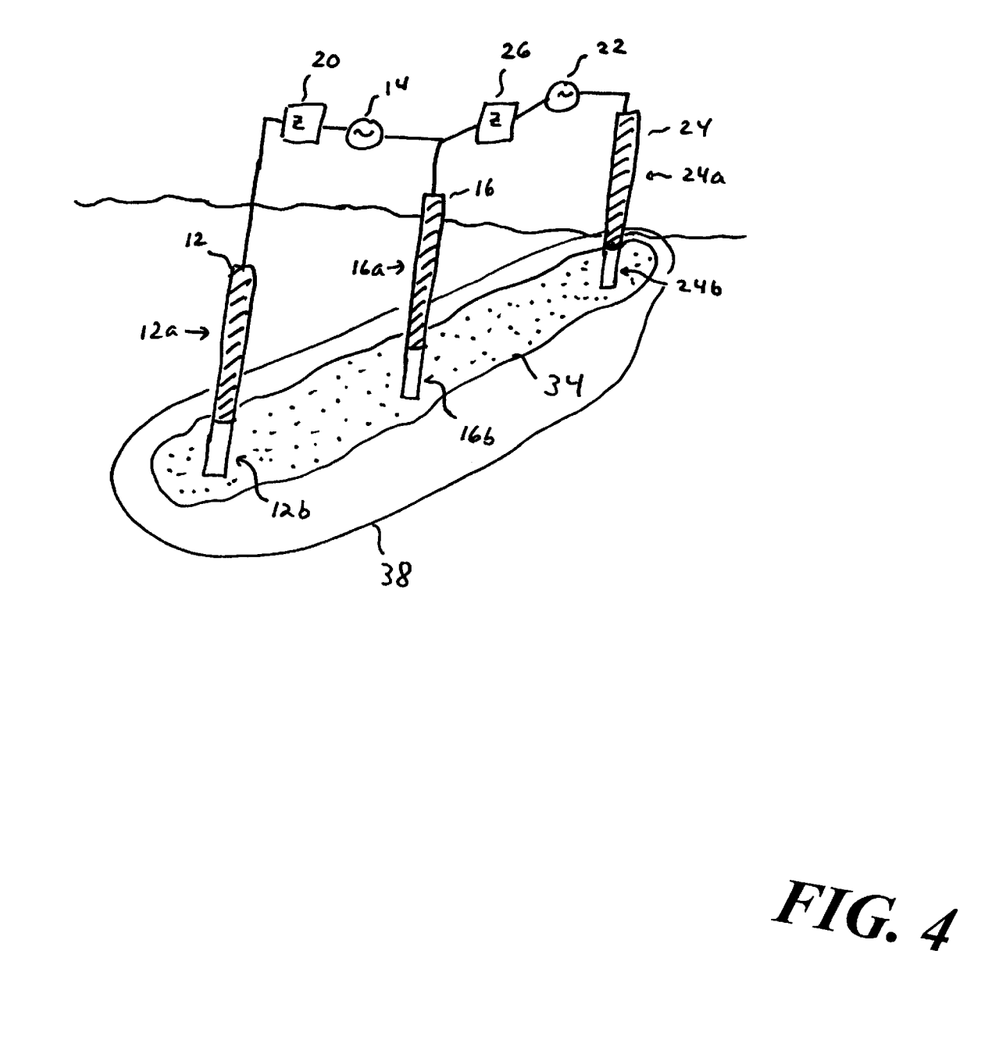
FIG. 4 shows the soil remediation system of FIG. 1 with the electrodes disposed to form an inclined remediation zone.
Figure 5:
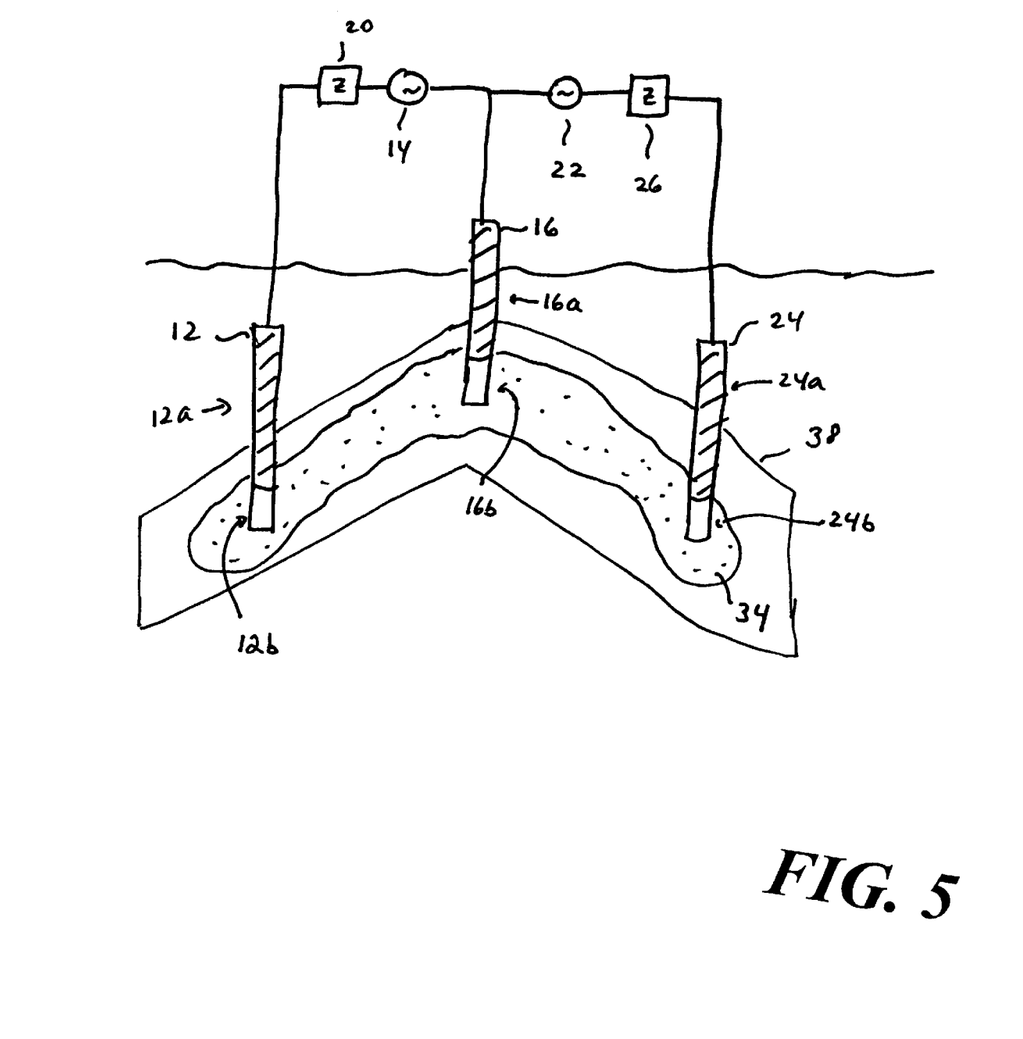
FIG. 5 shows the soil remediation system of FIG. 1 with the electrodes disposed to form a conical remediation zone.

Deployments other than that shown in FIG. 3 are appropriate when underground rock formations are such that the contaminated soil 34 has a different geometry. FIG. 4 shows an example in which an isocline causes the contaminated soil 34 to be sloped relative to the earth's surface. FIG. 5 shows an example in which an anticline causes the contaminated soil 34 to occupy a roughly conical zone. In both FIG. 4 and 5, note that the electrodes 12, 16, 24, 28 are buried at depths that place their uninsulated sections 12b, 16b, 24b, 28b in contact with the contaminated soil 34. In effect, the uninsulated sections 12b, 16b, 24b, 28b of the electrodes 12, 16, 24, 28 define a remediation zone 38 in which soil-heating currents will be generated. The electrodes 12, 16, 24, 28 are thus buried in such a way as to cause the remediation zone 38 to overlap, to the greatest extent possible, with the contaminated soil 34. This has the effect of tilting the plane of the remediation circle relative to the surface of the earth, thereby causing the projection of the circle on the earth's surface to be other than circular.

In operation, the first electrode 12 generates a sub-surface electric field having a field distribution given by $$E_1 = E_0 \cos(\theta)$$

where $\theta$ is a radial angle associated with the remediation circle 18. Similarly, the second and third electrodes 24, 28 generate sub-surface electric fields identical to that generated by the first electrode 12 but retarded in phase by 120 degrees and 240 degrees respectively. These sub-surface fields can be represented as:

$$E_2 = E_0 \cos(\theta - 120)$$

and $$E_3 = E_0 \cos(\theta - 240)$$

respectively.

The total sub-surface electric field is the superposition of the sub-surface fields generated by the three electrodes. This sub-surface field is therefore a rotating field given by:

$$E_{tot} = 3/2 E_0 \cos(\theta - t)$$

where is the frequency of the voltage waveform applied by the three phase-shifted voltage sources 14, 22, 30.

The three electrodes thus cooperate to generate a sub-surface traveling wave propagating in a circumferential direction along the remediation circle 18. Because the sub-surface wave traveling wave propagates along in the circumferential direction, it is often referred to as a "rotating field." This sub-surface rotating field drives sub-surface currents in the remediation zone 38. These currents pass through the contaminated soil 34 between uninsulated sections 12b, 16b, 24b, 28b of the electrodes. As this current traverses contaminated soil 34 having finite conductivity, a portion of the energy carried by the current is transformed into heat. The heat thus generated raises the temperature of any volatile contaminants present in the contaminated soil 34 and thereby hastens their evaporation.

Because the combined field generated by contributions of the three electrodes is a rotating field, the current driven by the electric field is more evenly distributed throughout the remediation zone. As a result, the temperature distribution within the remediation zone remains relatively constant during the remediation process. In addition, because only four electrodes are required, there is little likelihood that the boring of holes in the earth will disturb the sub-surface structures so as to disperse the contaminants over a wider region.

Figure 6:
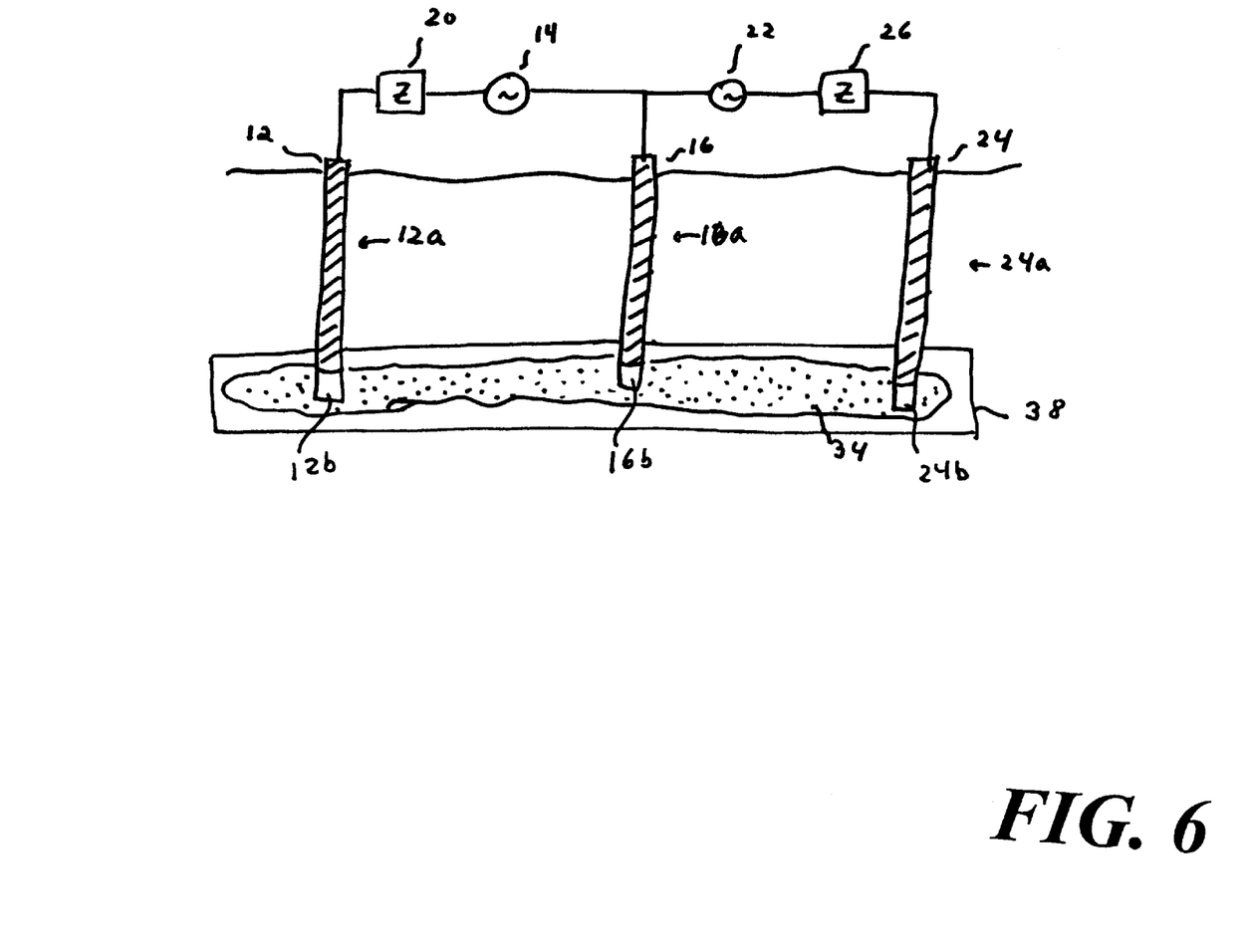
FIG. 6 shows an electrode in which the uninsulated section is shortened so as to form a thin remediation zone.
Figure 7:
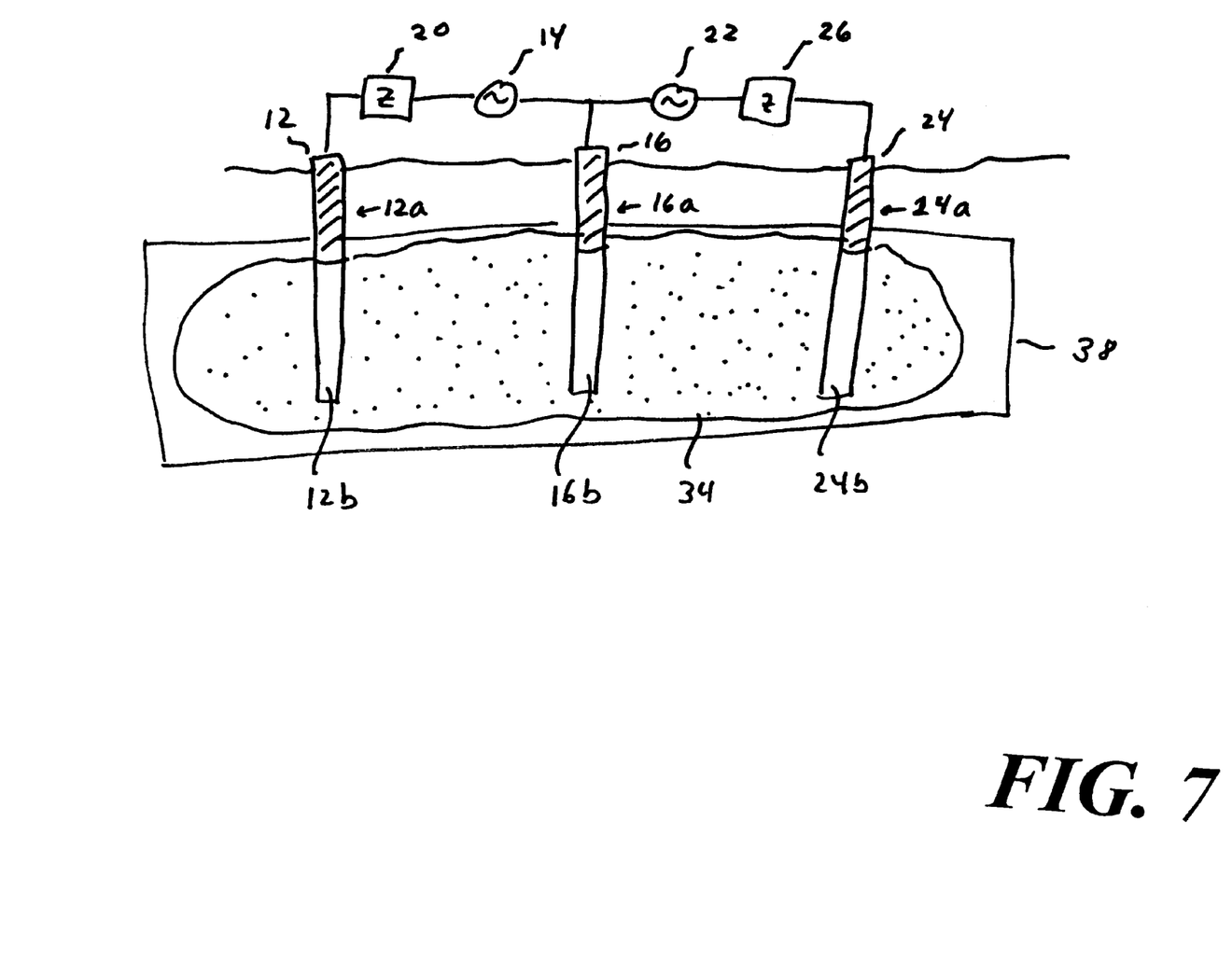
FIG. 7 shows an electrode in which the uninsulated section is lengthened to form a thicker remediation zone.

Because current can only flow from the electrically exposed surfaces of the uninsulated sections 12b, 16b, 24b, 28b of the electrodes 12, 16, 24, 28, the geometry of the remediation zone can be readily adjusted by changing the position and the surface area of the electrically exposed surfaces on the uninsulated sections 12b, 16b, 24b, 28b. For example, if a remediation zone is to be a thin layer, as shown in FIG. 6, one can reposition the insulating jacket surrounding the insulated sections 12a, 16a, 24a, 28a of the electrodes 12, 16, 24, 28 to increase the surface area of the insulated sections 12a, 16a, 24a, 28a at the expense of the exposed surface area of the uninsulated sections 12b, 16b, 24b, 28b, as shown in FIG. 6. Conversely, if the remediation zone is to be a thick layer, one can reposition the insulating jacket to increase the exposed surface areas of the uninsulated sections 12b, 16b, 24b, 28b of the electrodes 12, 16, 24, 28 at the expense of the surface areas of their insulated sections 12a, 16a, 24a, 28a, as shown in FIG. 7.

A soil remediation system 10 according to the invention does not need a neutral electrode 16 in order to generate a rotating field for evenly heating the remediation zone 38. However, the presence of a neutral electrode 16 is preferable to provide a known destination for currents traversing the remediation zone 38. Without a neutral electrode 16, currents flowing within the remediation zone 38 may flow outward to nearby structures, thereby posing a threat of personal injury to occupants of those structures. This is of particular importance when the loads on the three underground circuits (represented in part by the first, second, and third impedances in FIG. 1) are unbalanced.

The foregoing embodiment, in which three electrodes are excited with voltages phased 120 degrees apart, is advantageous because it reduces the number of holes that must be drilled in the contaminated region. However, a rotating sub-surface field can be generated using different numbers of electrodes having different sub-surface configurations. This can be achieved by exciting the electrodes with voltages having appropriate amplitudes and phases. The derivation of appropriate complex voltages is a mathematical exercise which is essentially the inverse of obtaining the electromagnetic field distribution from known sources.

Having described the invention and a preferred embodiment thereof, what is claimed as new and secured by Letters Patent is:

1. A system for heating earthen material with a sub-surface rotating field, said system comprising:
   a first electrode in electrical communication with said earthen material, said first electrode being driven by a first AC voltage and being disposed on a circumference of a circle;
   a second electrode in electrical communication with said earthen material, said second electrode being driven by a second AC voltage having a 120 degree phase difference relative to said first AC voltage, said second electrode being disposed on said circumference 120 degrees from said first electrode; and
   a third electrode in electrical communication with said earthen material, said third electrode being driven by a third AC voltage having a 120 degree phase difference relative to said second AC voltage, said third electrode being disposed on said circumference 120 degrees from said second electrode.

2. The system of claim 1 further comprising a neutral electrode in electrical communication with said first, second, and third electrodes.

3. The system of claim 2 wherein said neutral electrode is disposed at the center of said circle.

4. The system of claim 2 wherein said first electrode and said neutral electrode penetrate the surface of the earth to the same depth.

5. The system of claim 1 wherein said first electrode and said second electrode penetrate the surface of the earth to the same depth.

6. The system of claim 1 wherein said first electrode comprises an insulated section and an uninsulated section in electrical communication with said insulated section.

7. The system of claim 6 wherein said second electrode comprises an insulated section and an uninsulated section in electrical communication with said insulated section and said uninsulated section of said second electrode and said uninsulated section of said first electrode are at substantially the same depth below the surface of the earth.

8. The system of claim 6 wherein said first electrode comprises an insulating jacket movable along a longitudinal axis.

9. A method for heating earthen material, the method comprising the steps of:
   inserting first, second, and third electrodes along the circumference of a circle; and
   applying first, second, and third voltages to said first, second, and third electrodes respectively, thereby generating a sub-surface rotating electromagnetic field.

10. The method of claim 9 wherein said inserting step comprises the step of inserting said first, second, and third electrodes 120 degrees apart along said circle.

11. The method of claim 9 wherein said step of applying first, second, and third voltages comprises the steps of applying a phase difference of 120 degrees between said first voltage and said second voltage, and applying a phase difference of 240 degrees between said first voltage and said third voltage.

12. The method of claim 9 further comprising the step of positioning said first, second, and third electrodes to generate a heated zone having a specified geometry.

13. The method of claim 12 wherein said positioning step comprises the steps of selecting first, second, and third penetration depths for said first, second, and third electrodes.

14. The method of claim 9 further comprising the step of providing said first electrode with an insulated section having an insulated surface area and an uninsulated section having an uninsulated surface area, said uninsulated section being in electrical communication with said insulated section.

15. The method of claim 14 further comprising the step of adjusting said insulated surface area and said uninsulated surface area to form a heated zone having a prescribed geometry.

16. The method of claim 15 wherein said step of adjusting said insulated area and said uninsulated area comprises the step of adjusting an uninsulated length associated with said uninsulated section and adjusting an insulated length associated with said insulated section.

17. The method of claim 16 wherein said step of adjusting an uninsulated length comprises the step of translating an insulating jacket along a longitudinal axis of said first electrode.

18. A system for heating earthen material with a subsurface rotating field, said system comprising a heating element consisting of:
  a first electrode in electrical communication with said earthen material, said first electrode being driven by a first AC voltage and being disposed on a circumference of a circle;
  a second electrode in electrical communication with said earthen material, said third electrode being driven by a third AC voltage having a 120 degree phase difference relative to said second AC voltage, said third electrode being disposed on said circumference 120 degrees from said second electrode.

19. The system of claim 18 further comprising a neutral electrode in electrical communication with said first, second, and third electrodes.

20. The system of claim 19 wherein said neutral electrode is disposed at the center of said circle.

21. The system of claim 19 wherein said first electrode and said neutral electrode penetrate the surface of the earth to the same depth.

22. The system of claim 18 wherein said first electrode and said second electrode penetrate the surface of the earth to the same depth.

23. The system of claim 18 wherein said first electrode comprises an insulated section and an uninsulated section in electrical communication with said insulated section.

24. The system of claim 23 wherein said second electrode comprises an insulated section and an uninsulated section in electrical communication with said insulated section and said uninsulated section of said second electrode and said uninsulated section of said first electrode are at substantially the same depth below the surface of the earth.

25. The system of claim 23 wherein said first electrode comprises an insulating jacket movable along a longitudinal axis.

* * * * *